Sept. 12, 1939.  J. COTAL  2,173,009
ELECTROMECHANICAL CONTROL DEVICE FOR LATHES AND OTHER MACHINE TOOLS
Filed March 10, 1938  2 Sheets-Sheet 1
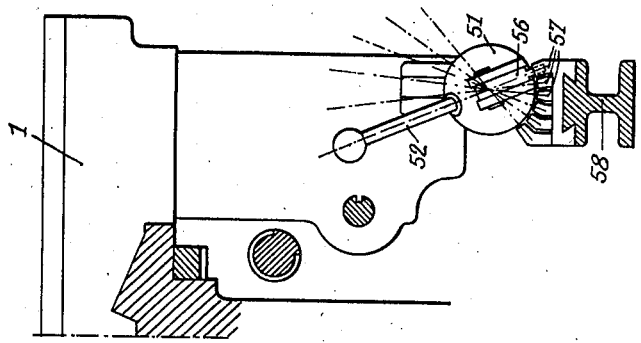
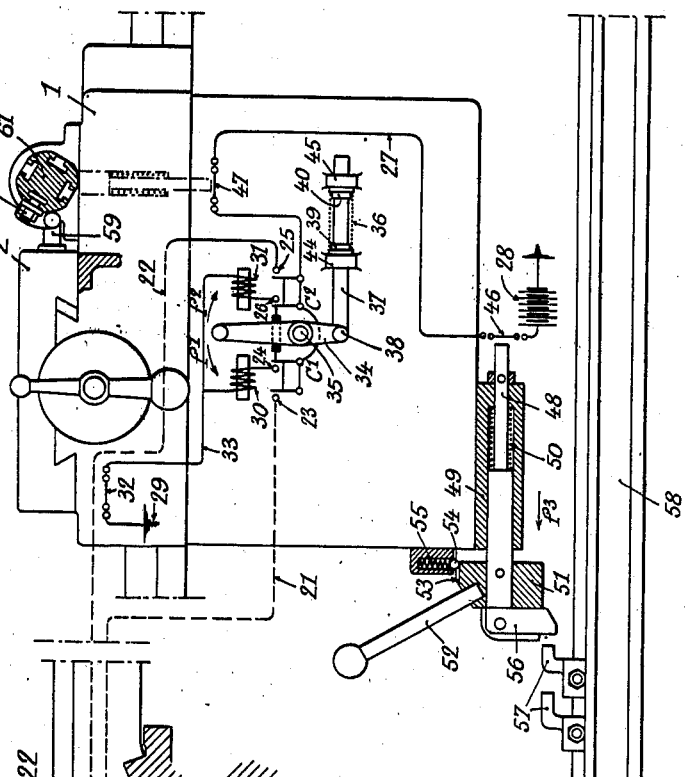
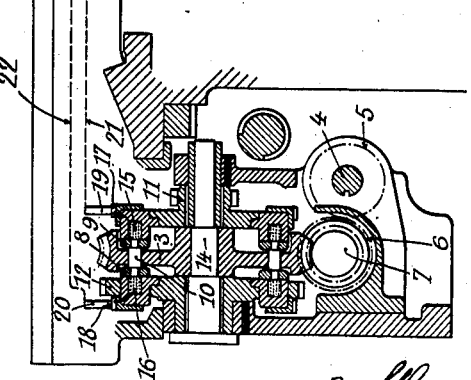
J. Cotal
INVENTor
By: Glascock Downing + Seebold
Attys.

Sept. 12, 1939.     J. COTAL     2,173,009
ELECTROMECHANICAL CONTROL DEVICE FOR LATHES AND OTHER MACHINE TOOLS
Filed March 10, 1938     2 Sheets-Sheet 2
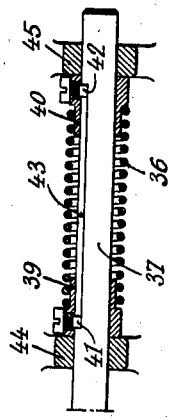
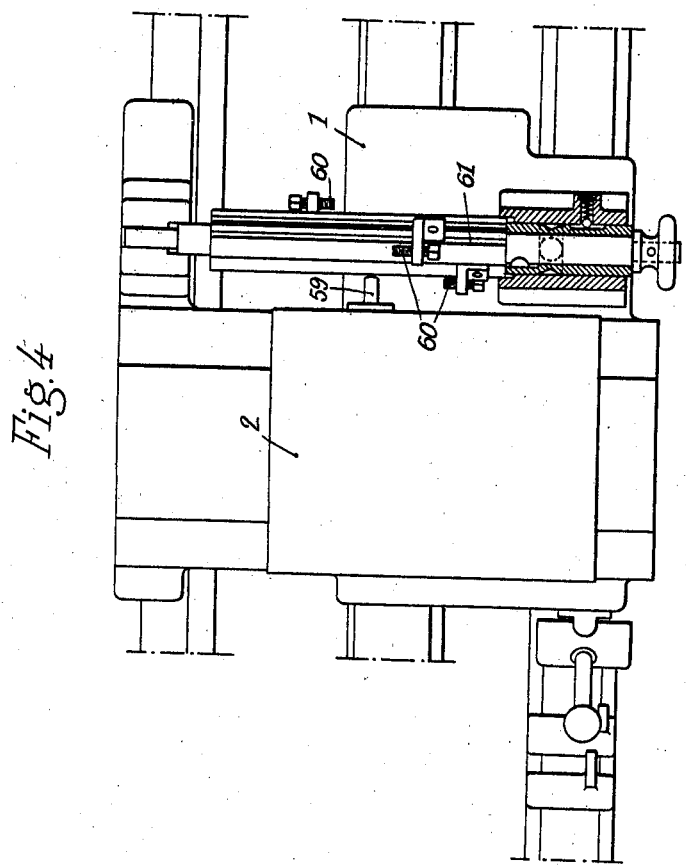

Patented Sept. 12, 1939

2,173,009

UNITED STATES PATENT OFFICE 2,173,009

ELECTROMECHANICAL CONTROL DEVICE FOR LATHES AND OTHER MACHINE TOOLS

Jean Cotal, Paris, France

Application March 10, 1938, Serial No. 195,166
In France March 11, 1937

5 Claims. (Cl. 82—21)

The present invention has for its object an electro-mechanical device for lathes and other machine tools which is chiefly characterized by the fact that it comprises in combination a driving member permanently rotating, two electromagnetic clutches inserted between said driving member and the feeding mechanisms of two sliding elements or other movable members of the machine, and a control mechanism adapted to engage the driven member of either clutch with the driving member.

According to another feature in the two supplying circuits of the electro-magnets of the two clutches are interposed switches combined with adjustable stop pieces on the path of said sliding elements or other driven members, so as to cause automatically the disengagement at a given point of the path of the element or other movable member.

According to another feature, the operating member is combined with electro-magnetic devices adapted to lock automatically said operating member in either of the two positions corresponding to the clutching position of either of the two electro-magnetic clutching mechanisms, the circuit of said locking electro-magnetic devices being opened either by a hand operated switch, or automatically by the above mentioned adjustable stop pieces in the same time when they cause the disengagement.

In the accompanying drawings, given only by way of example:

Fig. 1 is a vertical section through the axes of the selecting device for the feeding, of an apron of the lathe improved according to the invention.

Fig. 2 is a front view of said apron.

Figs. 3 and 4 are corresponding end and plan views of said apron.

Fig. 5 is a partial section, on a larger scale, of the elastic return device of the control member.

The device which is represented is adapted for the control of the carriage 1 and of the cross slide 2 of the lathe.

A wheel 3 (Fig. 1) receives its movement from a feed bar 4 through the intermediary of the wheels 5 and 6 and of a worm 7.

On either side of the wheel 3 is disposed an annular armature 8 or 9. The two armatures 8, 9 are connected together by studs 10, in suitable number, said studs being adapted to be moved axially in corresponding holes of the flange of the wheel 3.

Two wheels 11, 12 are mounted on either side of the wheel 3 and on the same axle 14. Said wheels control in a known manner the two feeding displacements; the wheel 12 controls the movement of the cross slide 2 by the intermediary of a pinion and of a worm, the wheel 11 controls the feed of the carriage 1 by means of a spur wheel and a pinion for engagement with a rack.

On each of the wheels 11 and 12 is secured an annular electro-magnet 15 or 16 whose magnetic poles are disposed opposite the armatures 8, 9. One end of each coil is grounded; the ether end is connected to a collecting ring 17, 18 secured to the electro-magnet.

Sliding contacts 19, 20 bear on the rings 17, 18; said contacts are connected by the wires 21, 22 to the contact pieces 23 and 25 of bipolar switches $C^1$ and $C^2$, the movable blades of which are connected in series, and also by wires 27 to one of the terminals of a pile, battery or other source of current 28. The other contact pieces 24 and 26 of the double switches are grounded at 29 through two electro-magnets 30 and 31. A hand operated switch 32 is inserted in the wire 33 which is common to the two electro-magnets 30 and 31.

The two switches $C^1$, $C^2$ are operated by hand lever 34 pivoting about an axle 35 and urged towards a median position by a spring 36 (Figs. 2 and 5). Said spring is wound about a rod 37 pivoted at 38 on the lever 34 between two rings 39 and 40 mounted on said rod.

Said rings 39 and 40 are provided with a pin 41, 42 sliding in a slot 43 of the rod 37, and said pins bear, when at rest, against stationary stop pieces 44, 45, whilst the pins 41, 42 are situated at the ends of the slot 43.

Under the action of the spring 36, the lever 34 is maintained in its median position for which the two switches $C^1$ $C^2$ are in the open position. It is apparent that when the lever 34 is pivoted in either direction, the rod 37 draws with it one of the pins 41 (or 42) and the corresponding ring 39 (or 40), whilst the other ring 40 (or 39) is maintained by the stop piece 45 (or 44) whereby the spring 36 is compressed.

The lever 34 passes between the pole pieces of the electro-magnet 30 and 31 which are so arranged that said lever 34 comes into contact with either of said pole pieces when said lever is pivoted in either direction for closing the switch $C^1$ or $C^2$.

The operation is as follows: At rest, the lever 34 is in its median position under the action of the spring 36. The switches $C^1$ and $C^2$ are open and also the switch 32. The electro-magnets 15 and 16 are not energized.

In order to engage the carriage 1 or the slide 2, the switch 32 is closed and the lever 34 is pivoted either in the direction of the arrow $F^1$ or in the opposite direction (arrow $f^2$). The switch $C^1$ or $C^2$ is closed.

When the switch $C^1$ is closed, current is supplied to the coil 15 and the wheels 3 and 11 are in engagement with the consequent feeding of the carrriage 1. At the same time the electro-magnet 30 is energized and its armature maintains the lever 34 in the clutching position.

In the same manner, when the switch C² is closed by the displacement of the lever 34 in the direction of the arrow f², the electro-magnet 16 is energized, and the wheels 8 and 12 are engaged assuring the feed of the cross-slide 2; the electro-magnet 31 is energized at the same time and locks the lever 34 in the corresponding clutching position.

In either case, in order to declutch it is sufficient to open the switch 32. The electro-magnet 30 or 31 is free from current and the lever 34 is returned in its median position by the spring 36, whereby the switch C¹ or C², which was closed is now opened.

The device may be completed by automatic means whereby the declutching is possible by opening the circuit between the switches C¹ C² and the source of current 28 by either the carriage 1 or the slide 2 for a given position along their paths.

For this purpose two switches 46 and 47 (Fig. 2) are inserted in the wire 27.

The switch 46 intended for the declutching of the longitudinal carriage 1 is combined with a rod 48 slidably mounted in a guide 49 secured to the carriage 1.

Said rod 48 urged by a spring 50 in the direction of the arrow f³ is secured to a barrel 51 (Figs. 2 and 3) provided with a lever 52 which is adapted to assume different angular positions by means of longitudinal slots 53 and a ball or other guiding member 54 urged by spring 55. The rod 48 has an extension in the shape of a radial finger 56, whose angular position depends upon the position of the barrel 51 and is chosen in such manner that the path of the finger 56 contains one of the stop pieces 57 which are secured on a stationary bar 58 and are adjustable in longitudinal and angular positions.

When the finger 56 comes into contact with one of the stop pieces 57, the rod 48 is slightly moved axially and operates the switch 46 with sudden interruption which interrupts the circuit, whereby the lever 34 may return to the declutching position under the action of the return spring 36.

After declutching, the apron is moved back by hand. The rod 48 moves back under the action of the spring 50 and switch 46 is closed automatically, but the lever 34 being in the declutching position the circuit remains interrupted.

The automatic declutching of the cross slide 2 is effected in analogous manner by the switch 47. A stud 59 (Figs. 2, 4) is secured to the cross slide 2, and adjustable stop pieces 60 are mounted on a rotatable rod 61 having four faces for instance each of which may received one or more stop pieces.

When the stud 59 comes into contact with a stop piece 60, it displaces slightly the rod 61 axially. Said rod by means of a transmission which is not represented operates a switch 47 with sudden interruption thus causing the interruption of the circuit.

Obviously the invention is not limited to the embodiments herein represented and described which have been chosen only by way of example. The above mentioned arrangements are suitable for aparallel lathes of the usual type; they are also applicable for all other machine-tools when it is desired to ensure the control and the selection of the movements of the carriages or slides.

Having now described my invention, what I claim as new and desire to secure by Letters Patent is:

1. A machine-tool provided with two movable elements adapted to be moved independently of each other comprising a driving rotatable member, two driven rotatable members disposed coaxially on either side of said driving member and adapted to control respectively said two elements, two electromagnetic clutches disposed respectively between each of said driven members and said driving member, and means adapted to energize selectively one of said electromagnetic clutches.

2. A machine-tool according to claim 1, in which said two electromagnetic clutches comprise two armatures rotatable with said driving member and slidingly mounted on said driving member on either side of this latter, and two electromagnets disposed respectively opposite each armature and rotatable respectively with each of said driven members and adapted when energized to attract respectively said armatures.

3. A machine-tool according to claim 1, in which said means adapted to energize selectively said electromagnetic clutches comprise a source of current, and a two-way switch adapted to connect said source of current respectively with any one of said electromagnetic clutches.

4. A machine-tool according to claim 1, in which said clutch energizing means comprise a source of current, a control lever movable in two directions from a neutral position, spring means adapted to urge said lever in its neutral position, two electromagnets adapted to attract said lever and to maintain the same in its extreme position respectively in either of said directions, two switches disposed on either side of said lever and adapted to be controlled by said lever and to connect said source of current respectively with one of said electromagnets and one of said electromagnetic clutches for one extreme position of said lever and with the other electromagnet and the other electromagnetic clutch for the other extreme position of said lever, whereby said lever is locked in one of its extreme operative positions by the corresponding electromagnet.

5. A machine-tool provided with two movable elements adapted to be moved independently of each other comprising a driving rotatable member, two driven rotatable members disposed coaxially on either side of said driving member and adapted to control respectively said two elements, two electromagnetic clutches disposed respectively between each of said driven members and said driving member, a source of current, a control lever movable in two directions from a neutral position, spring means adapted to urge said lever in its neutral position, two electromagnets adapted to attract said lever and to maintain the same in its extreme position respectively in either of said directions, two switches disposed on either side of said lever and adapted to be controlled by said lever, connecting means connecting said switches on one side with said source of current and on the other side respectively with said electromagnets and with the corresponding electromagnetic clutches, auxiliary switches inserted in said connecting means, stationary stop means, and movable stop means provided on said elements and adapted to cooperate with said stationary stop means and to control said auxiliary switches so as to cause the circuits to be broken and said control lever to be automatically moved into neutral position at a given point of the path of said movable elements.

JEAN COTAL.